United States Patent
Matsushima

(10) Patent No.: US 10,220,733 B2
(45) Date of Patent: Mar. 5, 2019

(54) VEHICLE SEAT

(71) Applicant: TOYOTA BOSHOKU KABUSHIKI KAISHA, Aichi-ken (JP)

(72) Inventor: Iwao Matsushima, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/631,608

(22) Filed: Jun. 23, 2017

(65) Prior Publication Data

US 2017/0368965 A1 Dec. 28, 2017

(30) Foreign Application Priority Data

Jun. 28, 2016 (JP) .................................. 2016-127961

(51) Int. Cl.
| | | |
|---|---|---|
| *B60N 2/20* | (2006.01) | |
| *B60N 2/68* | (2006.01) | |
| *B60N 2/90* | (2018.01) | |
| *B60N 2/64* | (2006.01) | |
| *B60N 2/60* | (2006.01) | |
| *B60N 2/70* | (2006.01) | |
| B60N 2/58 | (2006.01) | |

(52) U.S. Cl.
CPC ............. *B60N 2/20* (2013.01); *B60N 2/6009* (2013.01); *B60N 2/64* (2013.01); *B60N 2/643* (2013.01); *B60N 2/68* (2013.01); *B60N 2/682* (2013.01); *B60N 2/70* (2013.01); *B60N 2/90* (2018.02); *B60N 2/5816* (2013.01)

(58) Field of Classification Search
CPC ......... B60N 2/20; B60N 2/6009; B60N 2/686

USPC .......................... 297/452.18, 452.38, 378.12
See application file for complete search history.

(56) References Cited

U.S. PATENT DOCUMENTS

| | | | |
|---|---|---|---|
| 5,497,676 A | * | 3/1996 | Barnard .................. A47C 7/506 16/295 |
| 8,353,561 B2 | * | 1/2013 | Yamazaki ............ B60N 2/6009 297/452.38 |
| 2010/0244514 A1 | * | 9/2010 | Arima ...................... B60N 2/20 297/218.5 |
| 2016/0107553 A1 | * | 4/2016 | Imajo ....................... B60N 2/68 297/452.18 |

(Continued)

FOREIGN PATENT DOCUMENTS

| | | | |
|---|---|---|---|
| DE | 102009018651 A1 | * 10/2010 | ............... B60N 2/20 |
| JP | 11105547 A | * 4/1999 | |

(Continued)

*Primary Examiner* — Robert Canfield
(74) *Attorney, Agent, or Firm* — Greenblum & Bernstein, P.L.C.

(57) ABSTRACT

A vehicle seat, wherein a seat back includes a first member to which an operating lever is attached and a bezel attached to the first member to surround an outer periphery of the operating lever in a frame shape, wherein the first member has an opening hole through which the bezel passes, wherein the bezel is attached to a second member, which has higher strength and higher rigidity than the first member and is attached to the first member so as to close the opening hole, and is disposed in the opening hole, wherein an outer edge portion of the bezel covers the first member at a peripheral edge of the opening hole, and wherein the first member is attached to the seat back frame by locking a locking portion of the second member to a locked portion of the seat back frame.

8 Claims, 15 Drawing Sheets

(56) References Cited

U.S. PATENT DOCUMENTS

2017/0368971 A1* 12/2017 Matsushima ............ B60N 2/20
2018/0037144 A1*  2/2018 Makita ................... A47C 31/02
2018/0037147 A1*  2/2018 Tanaka ................... B60N 2/682

FOREIGN PATENT DOCUMENTS

| JP | 2009-136589 |    | 6/2009 |        |          |
|----|-------------|----|--------|--------|----------|
| JP | 5985389 B2  | *  | 9/2016 |        |          |
| JP | 2018001825 A| *  | 1/2018 | ...... | B60N 2/20|
| JP | 2018001827 A| *  | 1/2018 | ...... | B60N 2/20|

* cited by examiner

VEHICLE SEAT

CROSS-REFERENCE TO RELATED APPLICATIONS

This application claims priority from Japanese Patent Application No. 2016-127961 filed on Jun. 28, 2016, the entire contents of which are incorporated herein by reference.

TECHNICAL FIELD

The disclosure relates to a vehicle seat.

BACKGROUND

There is a vehicle seat in which an operating lever for forward tilting of a seat back and the like is attached to a back side of the seat back. In such a vehicle seat, when the seat back is tilted forward, a large load is applied to an attachment portion of the operating lever to release the locking. Therefore, it is necessary to firmly attach the operating lever to a back frame forming a framework. In an automobile seat disclosed in JP-A-2009-136589, a bracket is fixed to a seat back frame, and a case for accommodating the operating lever is attached to the bracket. Then, a shaping bracket for shaping a peripheral edge portion of a seat back cover by causing a peripheral edge portion of a through hole opened in the seat back cover to come into contact with its upper surface is attached to the bracket. Further, a bezel for hiding the peripheral edge portion of the seat back cover by covering the portions excluding the operating lever from above is attached to the bracket.

In the automobile seat disclosed in JP-A-2009-136589, the case for accommodating the operating lever, the shaping bracket for shaping the peripheral edge portion of the through hole of the seat back cover, and the bezel are separately attached to the bracket which is fixed to the seat back frame. Thus, the operating lever to which a large load is applied is firmly fixed to the seat back frame. However, the relative positional relationship among these parts may not be constant and a gap may occur in the joints among the parts, which may lead to deterioration in appearance quality.

SUMMARY

The disclosure provides a vehicle seat in which an operating lever is attached to a back side of a seat back and which is capable of suppressing deterioration in appearance quality while maintaining the attachment strength of the operating lever to a seat back frame.

According to an aspect of the disclosure, there is provided a vehicle seat including: a seat back; and an operating lever attached to a back side of the seat back; wherein the seat back includes a first member to which the operating lever is attached and a bezel attached to the first member to surround an outer periphery of the operating lever in a frame shape, wherein the first member has an opening hole through which the bezel passes, wherein the bezel is attached to a second member, which has higher strength and higher rigidity than the first member and is attached to the first member so as to close the opening hole, and is disposed in the opening hole, wherein an outer edge portion of the bezel covers the first member at a peripheral edge of the opening hole, and wherein the first member is attached to the seat back frame by locking a locking portion of the second member to a locked portion of the seat back frame.

Accordingly, the bezel is attached to the second member which is attached to the first member so as to close the opening hole of the first member. In this way, since the first member can be attached to the seat back frame in a state where the bezel is attached to the first member, the relative positional relationship between the bezel and the opening hole can be easily kept constant, as compared to the case where these parts are separately attached to the seat back frame. That is, it is possible to suppress deterioration in appearance quality due to a gap or the like occurring in the joint between these parts. Then, in this state, the first member is attached to the seat back frame by locking the locking part of the second member having higher strength and higher rigidity than the first member to the locked portion of the seat back frame. In this way, since the force applied to the operating lever is transmitted to the seat back frame through the second member, it is possible to secure the attachment strength of the operating lever to the seat back frame even without reinforcing the first member.

BRIEF DESCRIPTION OF DRAWINGS

In FIG. 1, a headrest is omitted.

In FIG. 2, a back cover is omitted.

In FIG. 3, the back cover is omitted.

DETAILED DESCRIPTION

FIGS. 1 to 15 show an embodiment of the disclosure. This embodiment is an example in which the disclosure is applied to an automobile seat. In each drawing, respective directions of an automobile and an automobile seat when the automobile seat is attached to the automobile are indicated by arrows. In the following, the descriptions relating to the directions will be made on the basis of these directions. An automobile seat 1 of the present embodiment includes a seat cushion 10 serving as a seating part, a seat back 20 serving as a backrest, and a headrest supporting a head. The headrest is omitted in each drawing.

Figure 1:
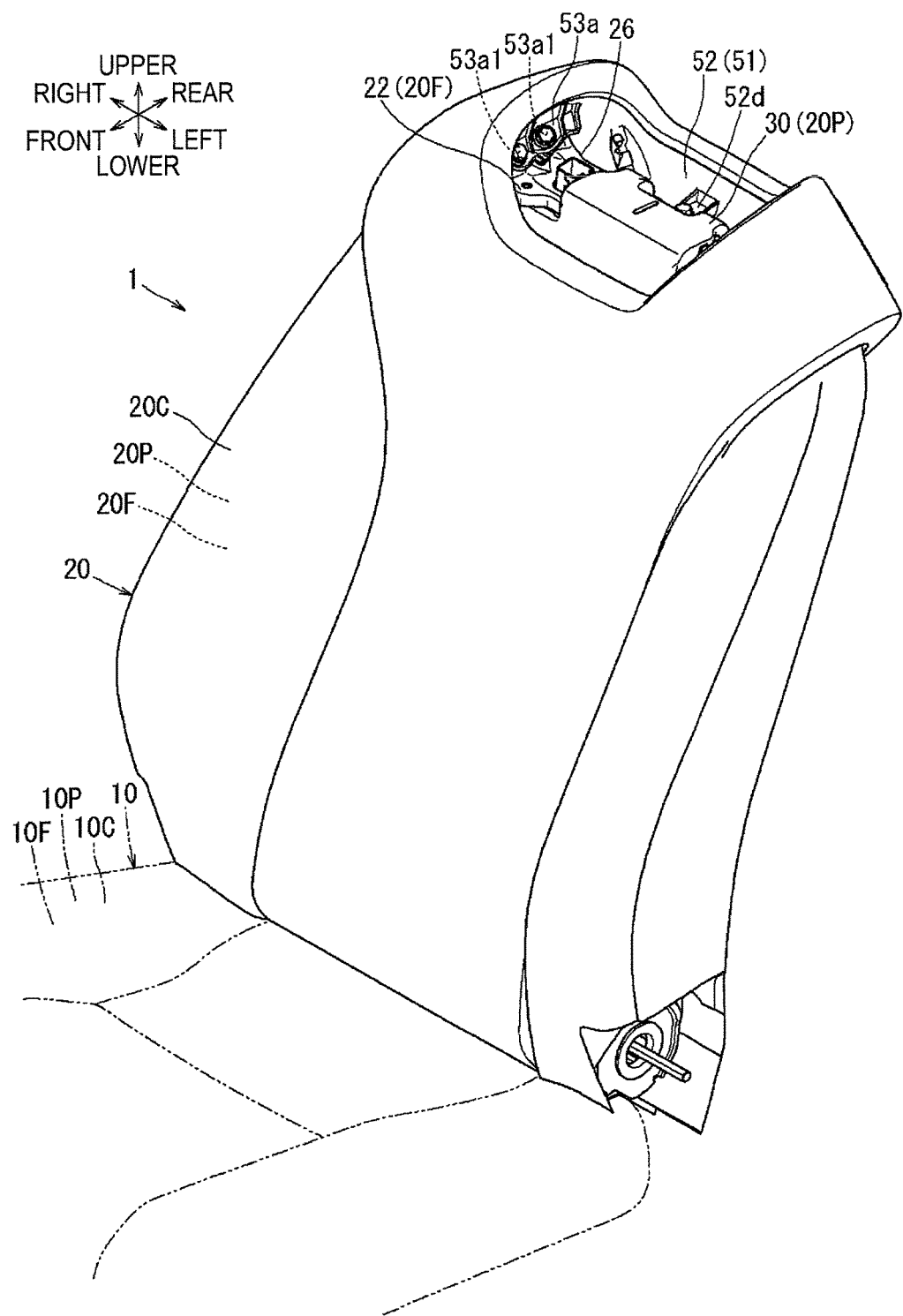
FIG. 1 is a perspective view of an automobile seat according to an embodiment of the disclosure, as seen obliquely from the front.

As shown in FIG. 1, the seat cushion 10 includes a cushion frame 10F that forms a framework, a cushion pad 10P that is a cushion member placed on the cushion frame 10F, and a cushion cover 10C that is a skin member covering the cushion pad 10P from above. Further, the seat back 20 includes a back frame 20F that forms a framework, a back pad 20P that is a cushion member placed on the back frame 20F, and a back cover 20C that is a skin member covering the back pad 20P from above. Since the seat cushion 10 and the headrest are known structures, the explanation thereof will be omitted, and the seat back 20 will be described. Here, the automobile seat 1, the back frame 20F and the back cover 20C correspond to the "vehicle seat," the "seat back frame," and the "seat back cover" in the claims, respectively.

Figure 2:
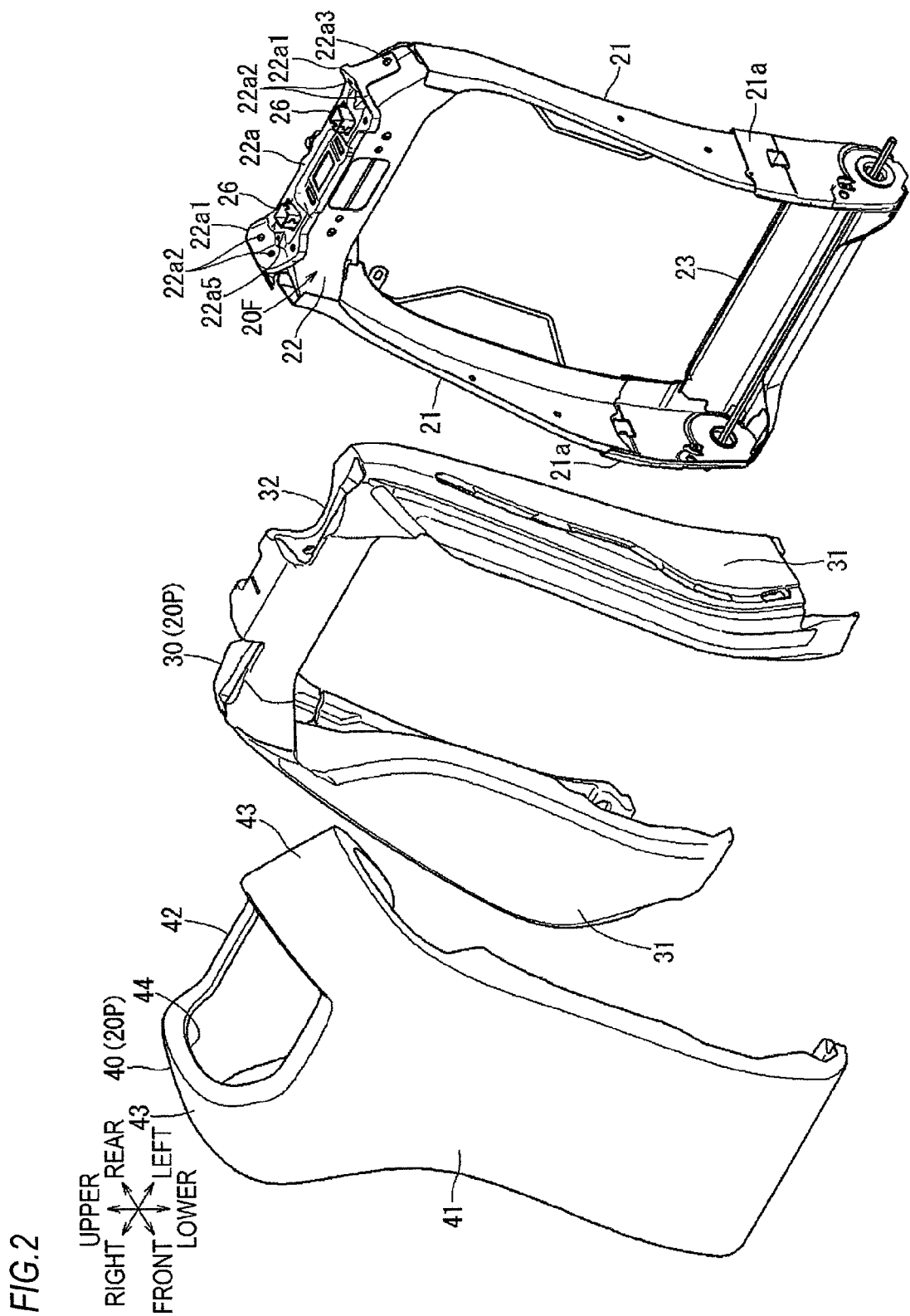
FIG. 2 is an exploded perspective view of a seat back of the automobile seat according to the above embodiment, as seen obliquely from the front.
Figure 3:
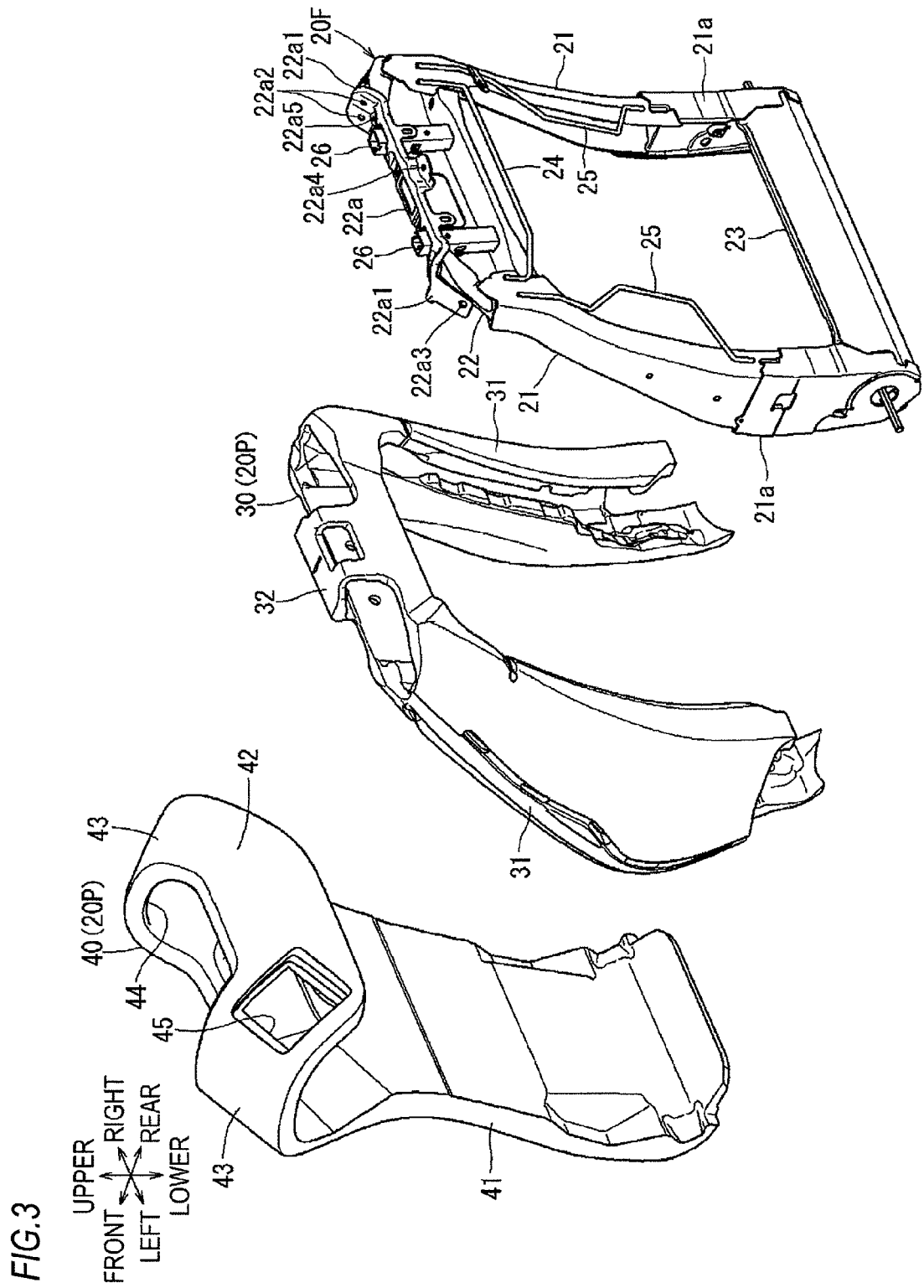
FIG. 3 is an exploded perspective view of the seat back of the automobile seat according to the above embodiment, as seen obliquely from the rear.

As shown in FIGS. 2 and 3, the back frame 20F of the seat back 20 is made of iron and includes a pair of left and right side frames 21 extending in an upper and lower direction, an upper frame 22 connecting upper end portions of the respective side frames 21 to each other, and a lower panel 23 connecting lower end portions of the respective side frames 21 to each other. The back frame 20F is formed in a substantially rectangular shape in a front view. Each of the side frames 21 is a substantially U-shaped press molded member whose cross section is opened in a seat inside direction. A reinforcing member 21a is attached to a lower end portion side of each side frame 21. Between rear surfaces of the upper end portions of the side frames 21, a locking wire 24 for attaching a base member 50 of a main back pad 40 (to be described later) to the back frame 20F is arranged to extend in a left and right direction. The locking wire 24 has a circular cross section. Further, between the lower end portion and the upper end portion of each side frame 21, a cover locking wire 25 for locking an end portion of the back cover 20C is arranged to extend in the upper and lower direction. The cover locking wire 25 has a circular cross section. The upper frame 22 is a substantially U-shaped press molded member whose cross section is opened in a seat rearward direction. A base member mounting member 22a for attaching the base member 50 of the main back pad 40 to the back frame 20F is attached to an upper surface of an upper surface portion of the upper frame 22. The base member mounting member 22a is a press molded member. A mountain-like portion 22a1 where a ridge line extend in a front and rear direction is formed on both left and right end sides of the base member mounting member 22a, respectively. On a seat inner side slope of each mountain-like portion 22a1, two bolt holes 22a2 are provided side by side in the front and rear direction. Further, a clip hole 22a3 is provided on an end side of a seat outer side slope of each mountain-like portion 22a1. A bolt hole 22a4 penetrating in the upper and lower direction is provided at the center portion in the left and right direction on the rear side of the base member mounting member 22a. Furthermore, a positioning pin hole 22a5 is provided on the seat inner side of the bolt holes 22a2. Between the upper surface portion of the upper frame 22 and the base member mounting member 22a, and the lower surface portion of the upper frame 22, a pair of holders 26 extending therethrough in the upper and lower direction is arranged at bilateral-symmetrical positions. Each holder 26 is a rectangular tubular member, and a headrest support is inserted and supported in an inner tubular portion of the holder. The lower panel 23 is a press molded member having a substantially L-shaped cross section. Besides these parts, a recliner for adjusting an inclination angle with respect to the cushion frame 10F and a wire for supporting the back pad 20P and the like are attached to the back frame 20F. However, since these members are not directly related to the disclosure, illustration and explanation thereof will be omitted. Here, the locking wire 24 corresponds to the "locked portion" in the claims.

Figure 13:
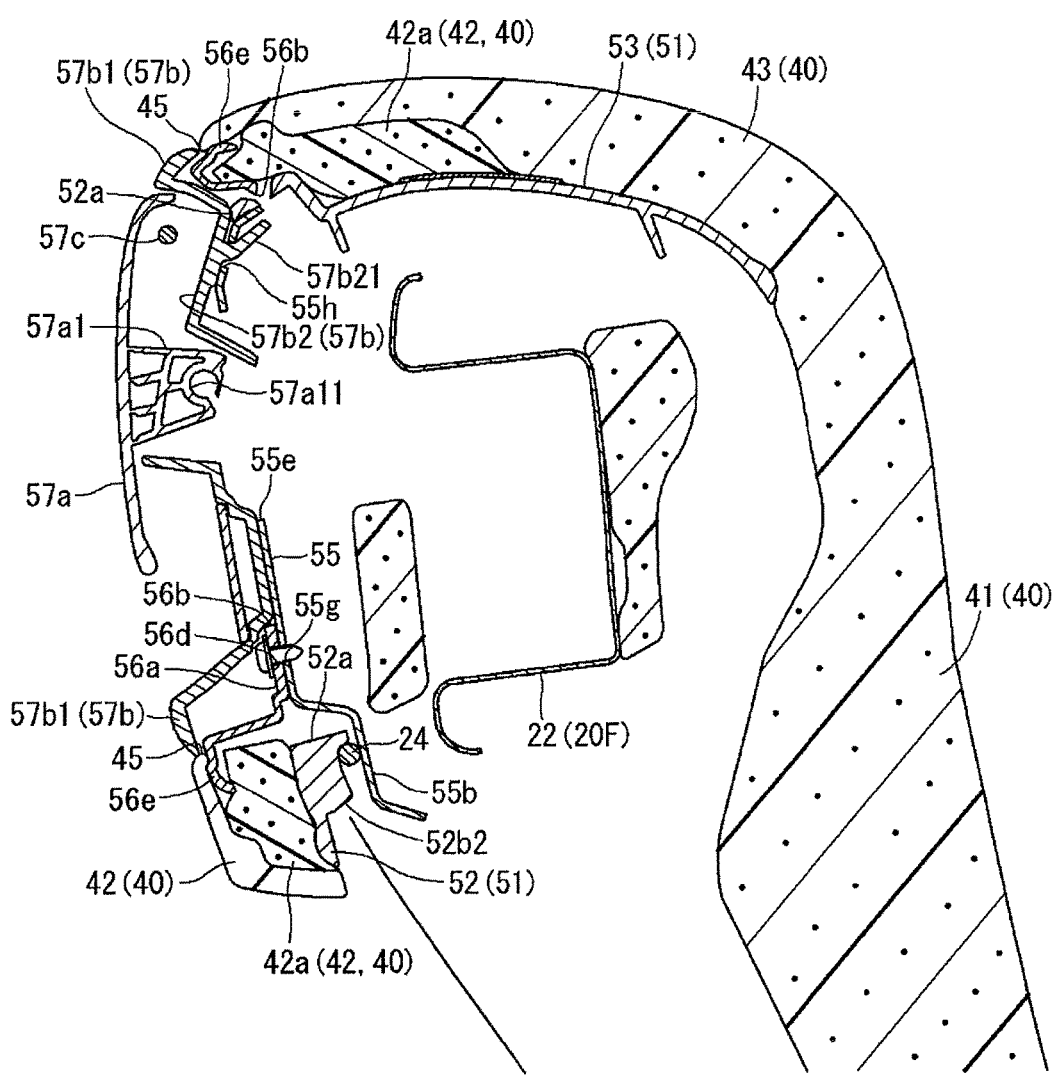
FIG. 13 is a sectional view taken along the line XIII-XIII shown in FIG. 12.
Figure 14:
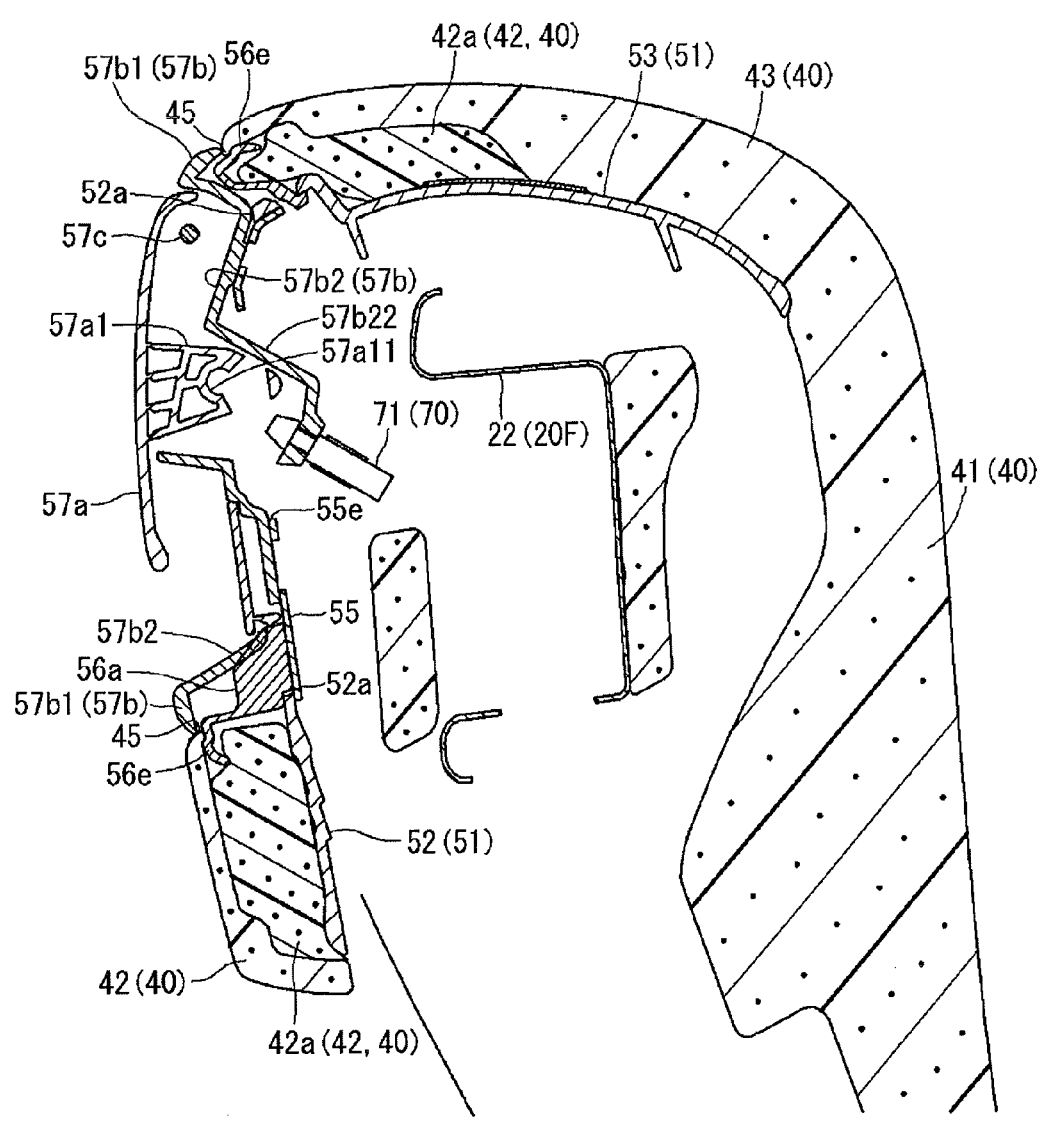
FIG. 14 is a sectional view taken along the line XIV-XIV shown in FIG. 12.

As shown in FIGS. 2 and 3, the back pad 20P includes a side back pad 30 for mainly supporting a body side of a seated occupant and a main back pad 40 for mainly supporting a body back of a seated occupant. The side back pad 30 is made of foamed urethane resin and is configured in such a way that upper end portions of a pair of left and right bank parts 31 are connected by an upper part 32. The side back pad 30 has a substantially inverted U shape in a front view. Each bank part 31 is attached to the back frame 20F so as to cover each side frame 21. The main back pad 40 is made of foamed urethane resin and is formed in an apron shape. The main back pad 40 includes a front surface portion 41, a rear surface portion 42, and a pair of left and right connecting portions 43 connecting the front surface portion 41 and the rear surface portion 42. The front surface portion 41 is shaped to be fitted into a space provided between the pair of left and right bank parts of the side back pad 30. The rear surface portion 42 is shaped to cover an upper rear surface portion of the back frame 20F. The pair of left and right connecting portions 43 connects an upper end portion of the front surface portion 41 and an upper end portion of the rear surface portion 42 to each other on the left and right sides, and thus, an opening portion 44 in which a headrest is disposed is formed at the center portion in the left and right direction. A through hole 45 corresponding to an opening 52a of the base member 50 (to be described later) is formed at a left end portion of the rear surface portion 42. As shown in FIGS. 13 and 14, the rear surface portion 42 and the connecting portions 43 are formed integrally with a support pad 42a disposed inside the seat from the rear surface portion 42 to the connecting portions 43. This is to compensate for the portion of the main back pad 40 which is difficult to be integrally formed by another pad. Here, the through hole 45 and the main back pad 40 correspond to, the "opening portion" and the "cushion member" in the claims, respectively.

Figure 4:
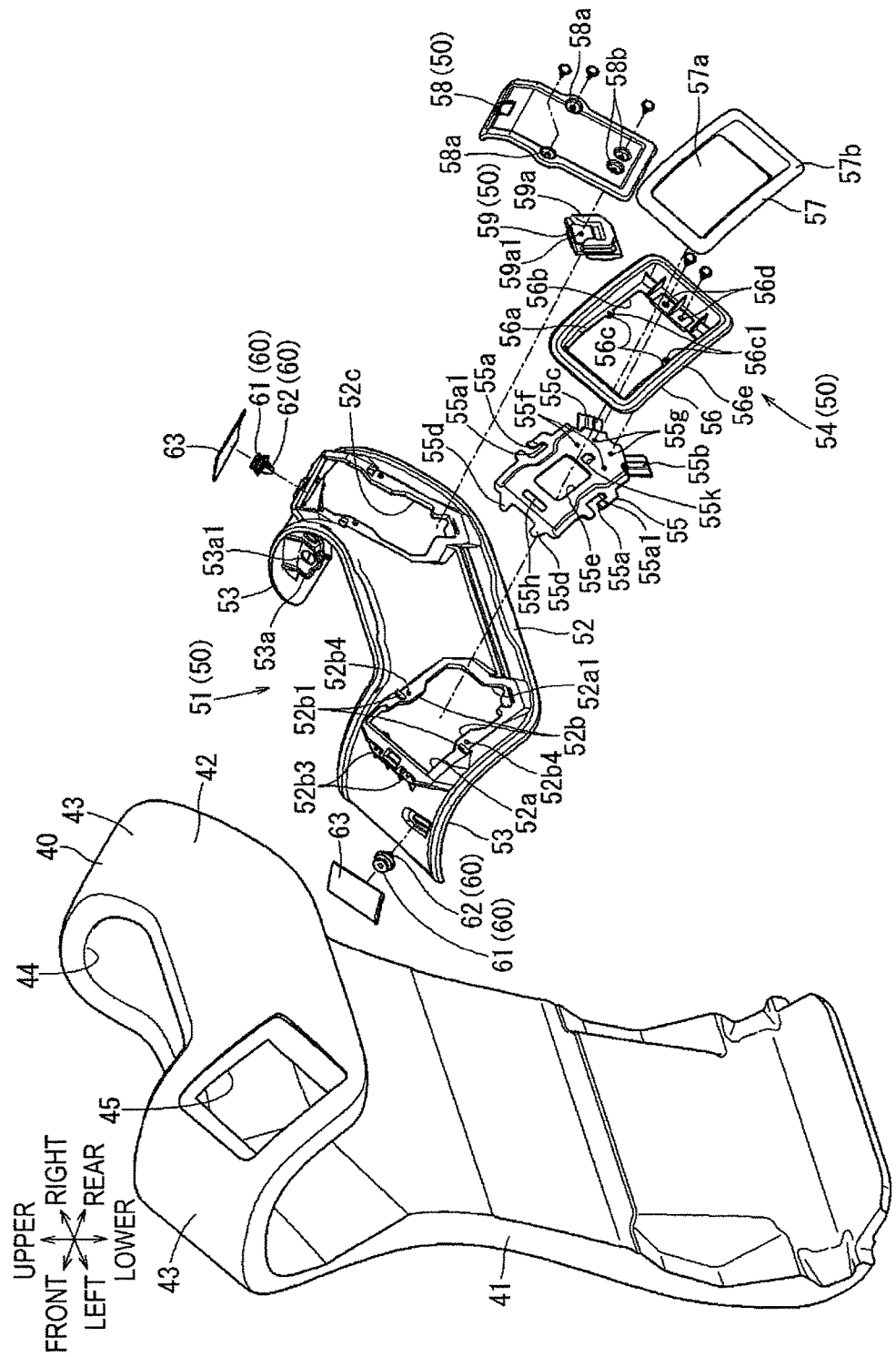
FIG. 4 is an exploded perspective view of a main back pad of the seat back according to the above embodiment, as seen obliquely from the rear.

As shown in FIG. 4, the base member 50, which is a part made of resin, is disposed from the front surface side of the rear surface portion 42 to the lower surface side of the connecting portions 43 of the main back pad 40. The base member 50 includes a main body part 51 formed by injection molding of polypropylene resin, a lever device part 54 attached to the left side of the main body part 51, and a lid member 58 and a locking member 59 attached to the right side of main body part 51.

Figure 5:
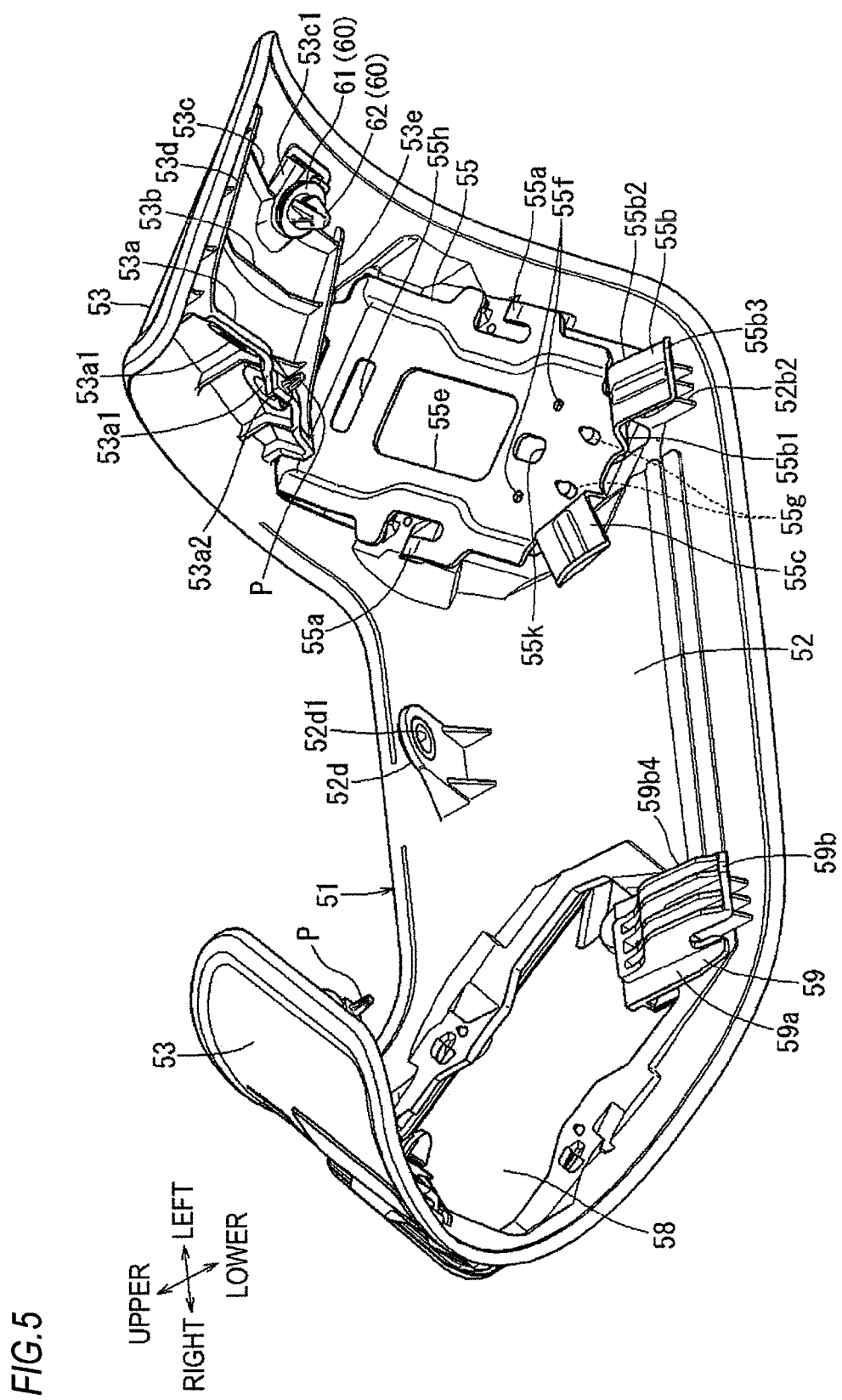
FIG. 5 is a perspective view of a base member of the main back pad according to the above embodiment, as seen from the right lower side.
Figure 6:
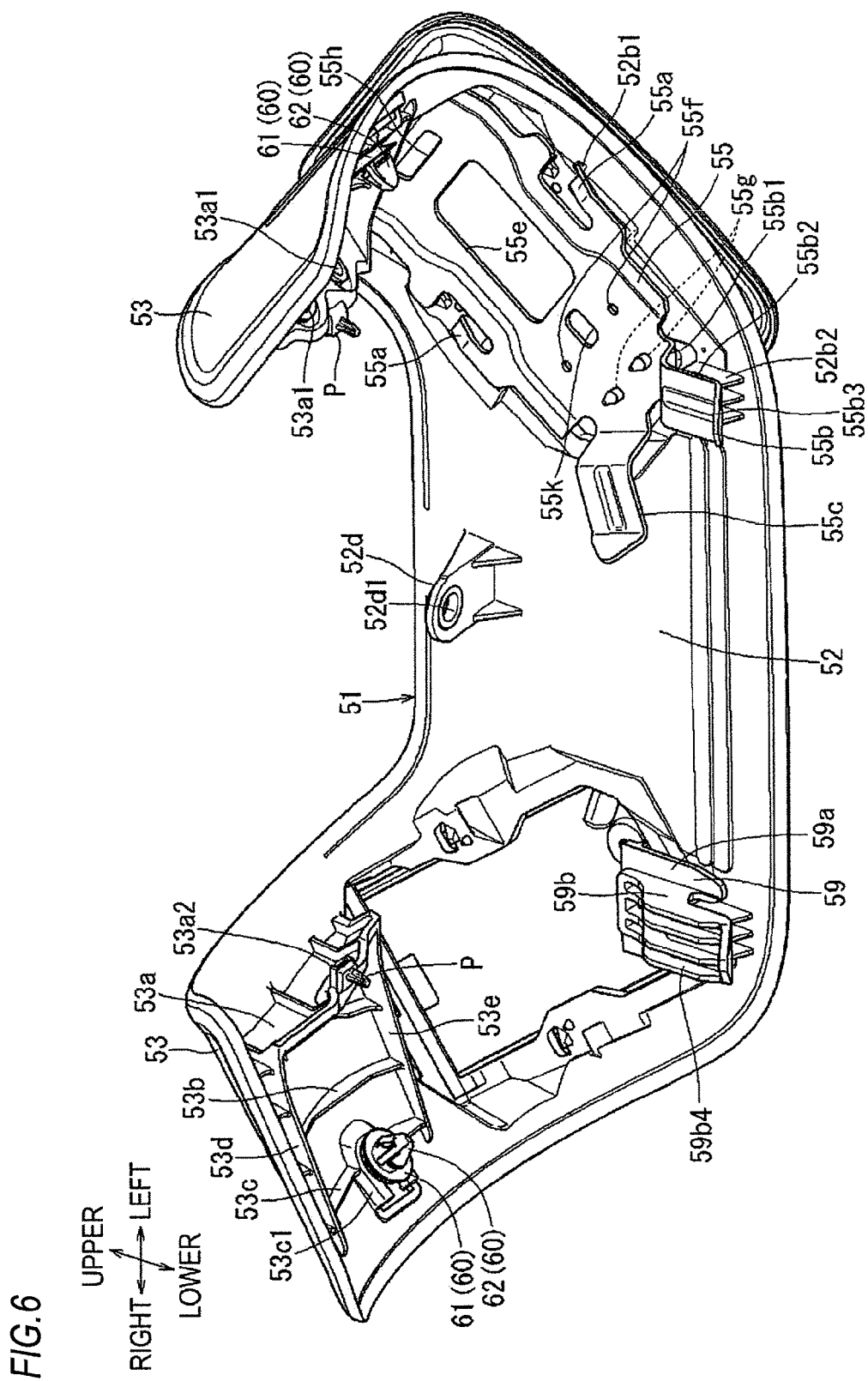
FIG. 6 is a perspective view of the base member of the main back pad according to the above embodiment, as seen from the left lower side.
Figure 7:
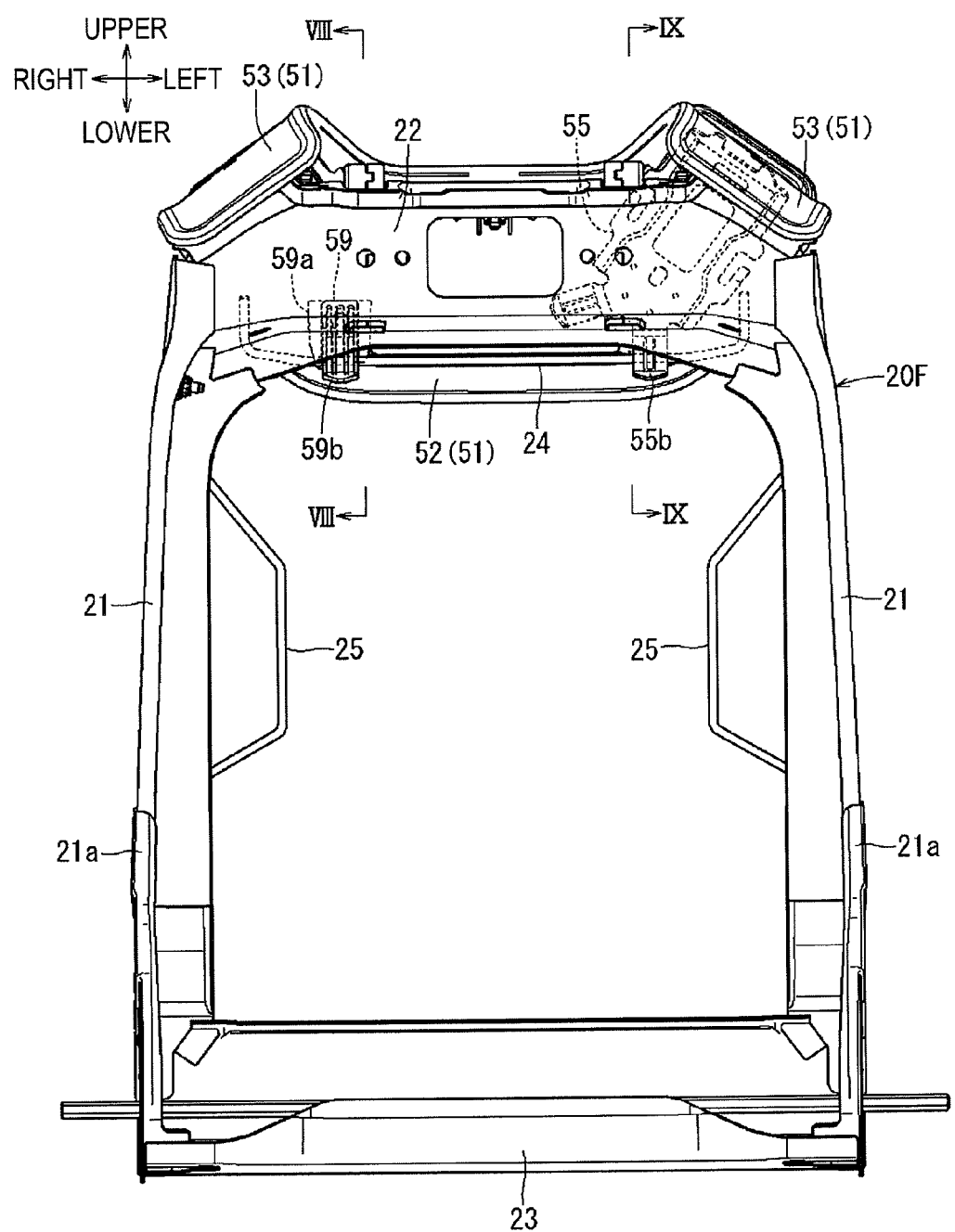
FIG. 7 is a front view showing a state in which the base member of the above embodiment is attached to a back frame.

As shown in FIGS. 4 to 6, the main body part 51 of the base member 50 includes a rear wall portion 52 that abuts against the front surface side of the rear surface portion 42 of the main back pad 40, and a pair of upper wall portions 53 that respectively abuts against the lower surface sides of the left and right connecting portions 43 of the main back pad 40. The opening 52a having a substantially rectangular shape in a rear view is formed from a left end portion of the rear wall portion 52 to a lower end portion of the left connecting portion 43. Specifically, the opening 52a is arranged such that the long side direction of the rectangular shape is inclined to the left side by about 45 degrees with respect to the center plane in the left and right direction of the main back pad 40. The opening 52a has a pair of protrusions 52b protruding to the inner side of the opening 52a substantially at the center portions of the long sides of the rectangular shape. A locking hole 52b1 for inserting and locking a middle claw portion 55a of a base plate 55 of the lever device part 54 (to be described later) is provided on an upper side of a root portion of each protrusion 52b. A screw hole 52b4 is provided slightly below the locking hole 52b1. A notch 52a1 is provided downward at a left lower corner portion of the opening 52a. Three standing wall portions 52b2 are formed on the front surface of the rear wall portion 52 on the lower side of the notch 52a1 and extend in parallel to each other in the upper and lower direction. A top surface portion 52b21 (see FIG. 9) of each standing wall portion 52b2 faces a left locking part 55b of the base plate 55 of the lever device part 54 (to be described later) to configure one of the locking portions. The notch 52a1 and the left locking portion 55b have substantially the same width in the left and right direction. Furthermore, a pair of locking holes 52b3 for inserting and locking a pair of upper claw portions 55d of the base plate 55 of the lever device part 54 (to be described later) is provided on an upper side of an upper short side of the opening 52a. An opening 52c having a substantially rectangular shape in a rear view is formed from the right end portion of the rear wall portion 52 to the lower end portion of the right connecting portion 43. Since the structure of the opening 52c and the rear wall portion 52 at the peripheral edge thereof is plane-symmetrical with that of the opening 52a and the rear wall portion 52 at the peripheral edge thereof with respect to the center plane in the left and right direction of the main body part 51, the explanation thereof will be omitted. Thus, the lever device part 54, and the lid member 58 and the locking member 59 are selectively attached to the opening 52a and the opening 52c of the main body part 51, respectively. A bolt fastening piece 52d is erected toward the front at the upper side of the center portion in the left and right direction on the front side of the rear wall portion 52. The bolt fastening piece 52d is provided with a bolt hole 52d1 through which a bolt for bolt-fastening to the upper frame 22 is passed. The bolt hole 52d1 is penetrated in the upper and lower direction. Here, the opening 52a and the opening 52c correspond to the "opening hole" in the claims, respectively.

As shown in FIGS. 4 to 6 and 10, three ribs extending in the front and rear direction are formed substantially parallel to each other on the lower surface side of the upper wall portion 53 of the main body part 51. These three ribs include a rib 53a, a rib 53b and a rib 53c from the inside toward the outside of the seat. Front end portions of the rib 53a, the rib 53b and the rib 53c are connected to each other by a rib 53d extending in the left and right direction. Rear end portions of the rib 53a, the rib 53b and the rib 53c are connected to each other by a rib 53e extending in the left and right direction. The rib 53a extends to be bent toward the center of the main body part 51 in the left and right direction from the middle. Two bolt holes 53a1 are provided side by side in the front and rear direction on the bent surface portion. Furthermore, a pin locking portion 53a2 for attaching a positioning pin P is formed at a lower end portion of the rib 53a. A clip seat 53c1 for attaching a clip 60 is provided at the center portion of the rib 53c in the front and rear direction. The clip 60 is a known clip made of resin and formed by a pedestal 61 and a locking leg 62 formed integrally from the pedestal 61. The locking leg 62 can be inserted and locked in the clip hole 22a3 provided in the base member mounting member 22a of the upper frame 22. The clip seat 53c1 is provided with an attaching hole to which the pedestal 61 of the clip 60 can be attached. After the clip 60 is attached to the clip seat 53c1, a lid member 63 for covering the depression caused by the clip seat 53c1 to smooth the surface is attached to the upper surface of the upper wall portion 53 on the side opposite to the clip seat 53c1.

Figure 8:
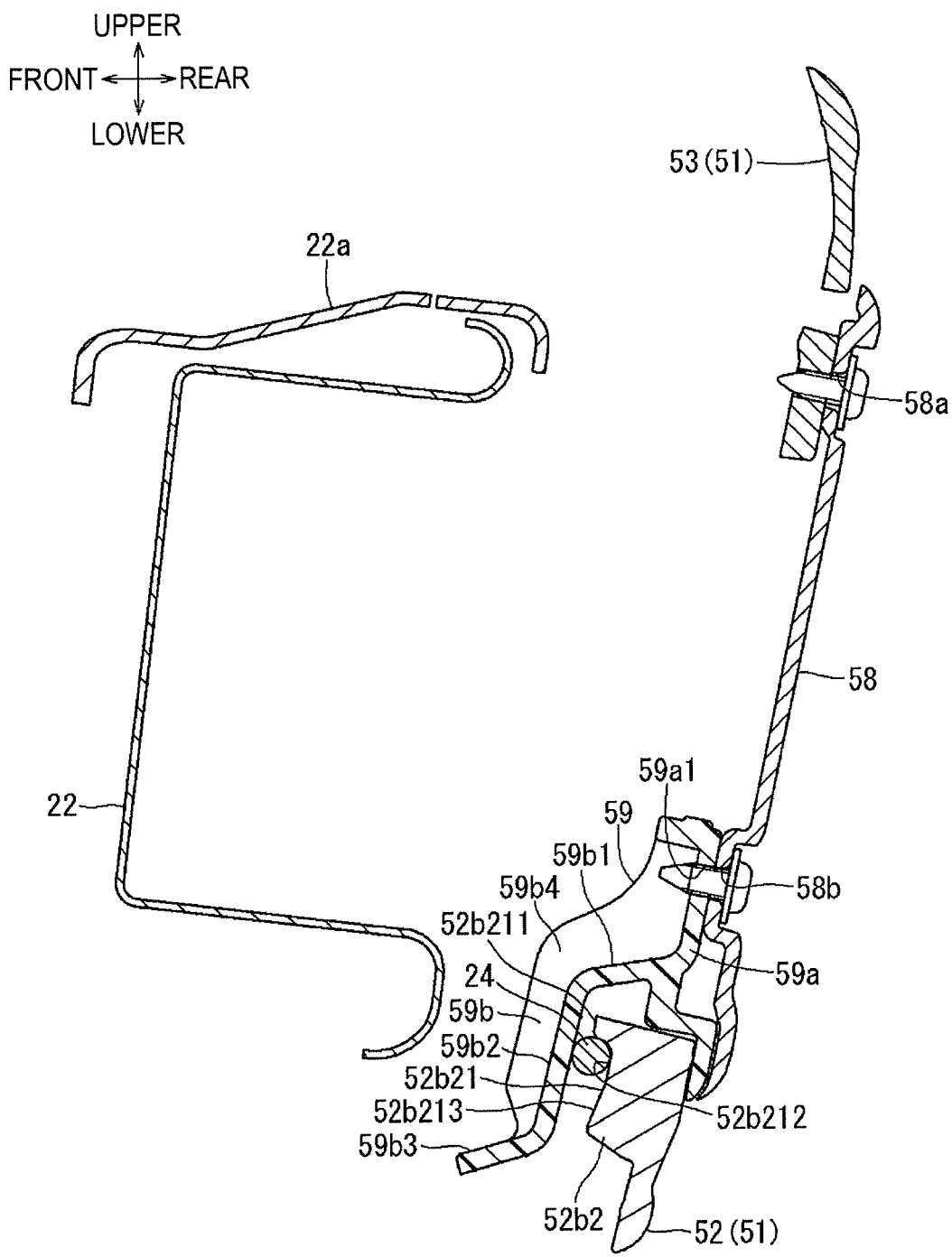
FIG. 8 is a sectional view taken along the line VIII-VIII shown in FIG. 7.
Figure 9:
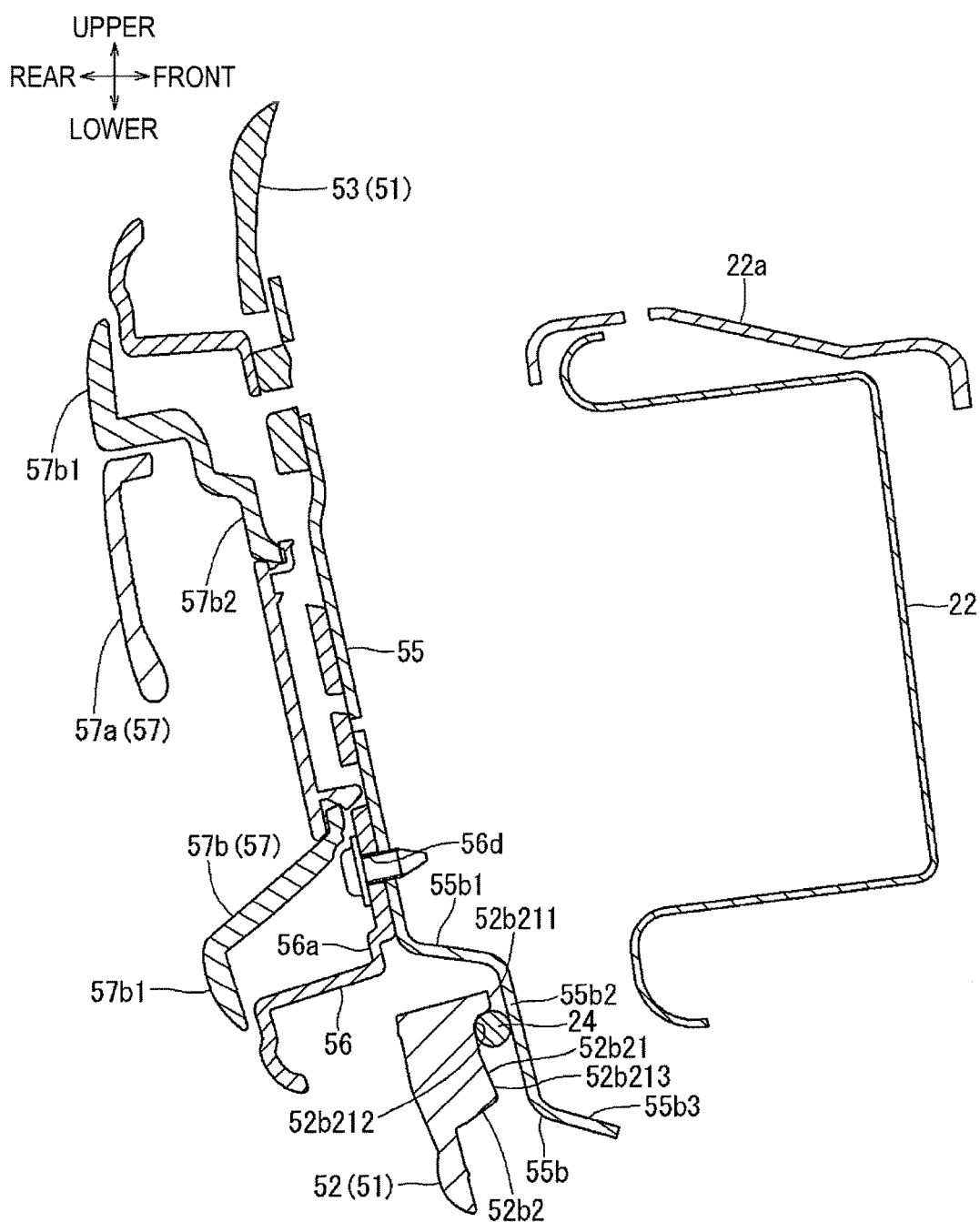
FIG. 9 is a sectional view taken along the line IX-IX shown in FIG. 7.

As shown in FIGS. 4 to 10, the lever device part 54 includes the base plate 55 that is a press molded member of a steel plate, an intermediate frame body 56 made of resin, and a lever device 57. The base plate 55 has a substantially rectangular shape in a rear view. A middle claw portion 55a is respectively formed substantially at the center portions of the long sides of the rectangular shape and extends upward in parallel with the long side. A pair of upper claw portions 55d is formed at an upper side of the upper short side. A screw hole 55a1 is respectively formed between the middle claw portions 55a and the main body of the base plate 55. Further, a left locking portion 55b having a substantially rectangular shape in a rear view is formed at the left lower corner of the base plate 55, and a right locking portion 55c having a substantially rectangular shape in a rear view is formed at the right lower corner of the base plate 55. As shown in FIG. 9, the left locking portion 55b has a standing wall portion 55b1 rising forward at an obtuse angle with respect to the main body of the base plate 55 and a pressing wall portion 55b2 extending downward from a leading end portion of the standing wall portion 55b1 in parallel with the main body of the base plate 55. Furthermore, the left locking portion 55b has a guide wall portion 55b3 extending forward from a leading end portion of the pressing wall portion 55b2 in parallel with the standing wall portion 55b1. The pressing wall portion 55b2 is a portion that holds the locking wire 24 fitted between the standing wall portion 52b2 of the main body part 51 and the pressing wall portion 55b2 when the base plate 55 is attached to the main body part 51 of the base member 50. The top surface portion 52b21 of the standing wall portion 52b2 has a first portion 52b211 which is located at an upper end and has the smallest gap with respect to the pressing wall portion 55b2, a second portion 52b212 which is smoothly connected from the first portion 52b211 and has the largest gap with respect to the pressing wall portion 55b2, and a third portion 52b213 which is smoothly connected from the second portion 52b212 and has a medium gap with respect to the pressing wall portion 55b2. The third portion 52b213 is located at a lower end of the top surface portion 52b21 of the standing wall portion 52b2. That is, when the pressing wall portion 55b2 holds the locking wire 24 fitted between the standing wall portion 52b2 and the pressing wall portion 55b2, the locking wire 24 is prevented from going upward beyond the second portion 52b212. Further, as the position of the locking wire 24 is displaced from the second portion 52b212 toward the third portion 52b213, a pressing force from the pressing wall portion 55b2 and the standing wall portion 52b2 against the locking wire 24 is increased. Meanwhile, even when the locking wire 24 is positioned at the second portion 52b212, the pressing force from the pressing wall portion 55b2 and the standing wall portion 52b2 against the locking wire 24 does not become zero. The guide wall portion 55b3 is a portion that functions to guide the locking wire 24 between the pressing wall portion 55b2 and the standing wall portion 52b2. The right locking portion 55c is plane-symmetrical with the left locking portion 55b with respect to a plane perpendicular to the base plate 55 and passing through the bisection point of the short sides thereof. This configuration allows the right locking portion 55c to perform the same function in cooperation with the right standing wall portion 52b2 when the base plate 55 is attached to the right opening 52c of the main body part 51. Furthermore, an opening portion 55e through which a wire connection portion 57b22 of the lever 57a of the lever device 57 with an operating wire 70 disposed inside the seat back 20 passes is provided substantially at the center portion of the base plate 55. At symmetrical positions with respect to the perpendicular bisector of the short sides on the lower end portion side of the base plate 55, a pair of screw holes 55f is provided at the upper side and a pair of screw holes 55g is provided at the lower side. Furthermore, a horizontally-long rectangular locking hole 55h is provided above the opening portion 55e of the base plate 55, and a vertically-long rectangular locking hole 55k is provided below the opening portion 55e. Here, the main body part 51 corresponds to the "first member" in the claims. Further, the base plate 55 corresponds to the "second member" in the claims. Furthermore, the left locking portion 55b and the right locking portion 55c correspond to the "locking portion" and "protrusion piece" in the claims, respectively.

As shown in FIGS. 4, 9, 10 and 13 to 15, the intermediate frame body 56 has a rectangular outer shape in a rear view, and includes a rectangular frame-like outer frame portion 56e provided at an outer peripheral portion and a recessed portion 56a recessed forward at the center of the outer frame portion 56e. The recessed portion 56a has a rectangular opening portion 56b. A protrusion 56c protruding inward is respectively provided on the long side portions of the peripheral edge of the opening portion 56b. A screw hole 56c1 is formed in each protrusion 56c. In the recessed portion 56a on the lower short side of the peripheral edge of the opening 56b, a pair of screw holes 56d is provided at symmetrical positions with respect to the perpendicular bisector of the short sides.

As shown in FIGS. 4, 9 and 13 to 15, the lever device 57 includes the lever 57a and the case member 57b. The case member 57b has a rectangular outer shape in a rear view, and includes a rectangular frame-like outer edge portion 57b1 provided at an outer peripheral portion and a recessed portion 57b2 recessed forward at the center of the outer edge portion 57b1. Two locking claws 57b21 protruding obliquely upward are provided on the upper end side of the recessed portion 57b2. The wire connection portion 57b22 for locking a terminal portion of an outer cable 71 of the operating wire 70 is provided slightly above the center of the recessed portion 57b2 in the upper and lower direction. Further, a pair of screw holes 57b23 and a pair of locking claws 57b24 located between the pair of screw holes 57b23 are provided on the lower end side of the recessed portion 57b2. The lever 57a is supported to be pivotable in the upper and lower direction around a shaft 57c with respect to the case member 57b. A wire locking protrusion 57a1 having a wire locking portion 57a11 is provided on the front side surface of the lever 57a. A terminal portion of an inner cable 72 of the operating wire 70 is locked to the wire locking protrusion 57a1. As the lever 57a is pivoted in the upper and lower direction with respect to the case member 57b, the inner cable 72 of the operating wire 70 disposed inside the seat back 20 can be pulled to operate a lock member (not shown) and the like. Here, the lever 57a and the case member 57b correspond to the "operating lever" and the "bezel" in the claims, respectively.

As shown in FIGS. 4 to 8, the lid member 58 has a substantially rectangular shape in a rear view. A pair of screw holes 58a is provided in the vicinity of both ends in the center of the long side portions of the lid member 58, and a pair of screw holes 58b is provided at symmetrical positions with respect to the bisector of the short sides in the vicinity of the lower short side portion of the lid member 58. The locking member 59 is an integrally molded member made of resin and has a base portion 59a and a locking wall portion 59b. When fitted to the notch 52a1 of the right opening 52c from above, the base portion 59a is adapted to clamp the peripheral edge portion of the notch 52a1 from the front and rear sides. A screw hole 59a1 through which a screw for screw-fixing to the right screw hole 58b of the lid member 58 passes is provided on the upper end side of the base portion 59a. As shown in FIG. 8, the locking wall portion 59b has a standing wall portion 59b1 rising forward at an obtuse angle with respect to a screw-fastening surface portion of the base portion 59a with the lid member 58. Further, the locking wall portion 59b has a pressing wall portion 59b2 extending downward from a leading end portion of the standing wall portion 59b1 in parallel with the screw-fastening surface portion of the base portion 59a with the lid member 58. Furthermore, the locking wall portion 59b has a guide wall portion 59b3 extending forward from a leading end portion of the pressing wall portion 59b2 in parallel with the standing wall portion 59b1. Four ribs 59b4 for reinforcement are erected in parallel to each other on the front surface portion side from the base portion 59a to the pressing wall portion 59b2 via the standing wall portion 59b1. The standing wall portion 59b1, the pressing wall portion 59b2 and the guide wall portion 59b3 of the locking wall portion 59b respectively correspond to the standing wall portion 55b1, the pressing wall portion 55b2 and the guide wall portion 55b3 of the left locking portion 55b of the base plate 55, and the shape of the contact surface thereof with the locking wire 24 is similarly formed. Here, the lid member 58 corresponds to the "blind lid" in the claims.

An assembling procedure of the seat back 20 will be described with reference to FIGS. 1 to 10. The upper claw portions 55d of the base plate 55 are locked to the locking holes 52b3 of the man body part 51, and the middle claw portions 55a of the base plate 55 are locked to the locking holes 52b1 of the main body part 51. Further, the base portion 59a of the locking member 59 is fitted to the right notch 52a1 of the main body part 51. In this state, the lid member 58 is placed to cover the opening 52c of the main body part 51. The screw holes 58a are aligned with the screw holes 52b4, and then, the screw fixing is performed. The right screw hole 58b is aligned with the screw hole 59a1, and then, the screw fixing is performed. Furthermore, the lid member 63 is fixed to the upper surface of the main body part 51 by adhesion or the like in a state where the clip 60 is attached to the clip seat 53c1 of the main body part 51. In addition, the positioning pin P is attached to the pin locking portion 53a2. As shown in FIGS. 13 and 14, the support pad 42a is attached, by adhesion or the like, to the base member 50 on which the base plate 55, the lid member 58 and the locking member 59 are attached. The base member 50 in this state is attached to the front surface side of the rear surface portion 42 of the main back pad 40 by adhesion or the like. At this time, the base plate 55 of the base member 50 is exposed from the through hole 45 of the main back pad 40. In this state, the intermediate frame body 56 is placed to cover the base plate 55 of the base member 50. The screw holes 55g are aligned with the screw holes 56d, and then, the screw fastening is performed. Further, as shown in FIG. 4, the screw holes 56c1, the screw holes 55a1 and the screw holes 52b4 are aligned, and then, the screw fastening is performed. At this time, the outer frame portion 56e of the intermediate frame body 56 is put on the peripheral edge portion of the through hole 45 of the support pad 42a to cover the peripheral edge portion.

Figure 15:
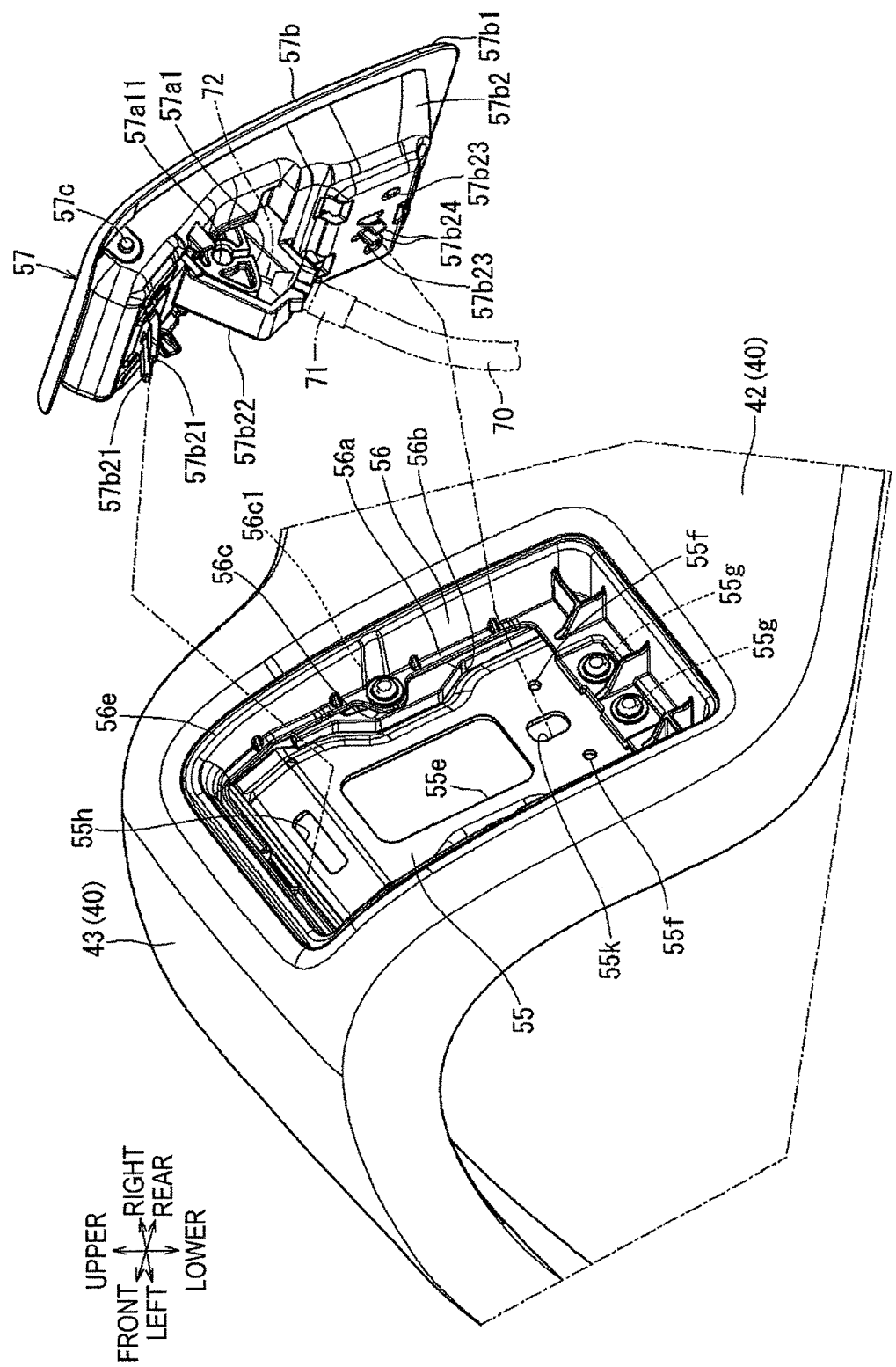
FIG. 15 is a view for explaining an assembling procedure of a lever device part of the above embodiment.

Next, as shown in FIGS. 13 to 15, the backcover 20C is put on the main back pad 40 to which the base member 50 having the support pad 42a attached thereto is attached. Then, a hole having the same size as the through hole 45 is drilled at the formation portion of the through hole 45, and then, a terminal portion is processed. In this state, a terminal portion of the operating wire 70 is pulled out from the inside of the seat, a terminal portion of the outer cable 71 is locked to the wire connection portion 57b22 of the lever device 57, and a terminal portion of the inner cable 72 is locked to the wire locking portion 57a11 of the lever 57a. In this state, the locking claws 57b21 and the locking claws 57b24 of the lever device 57 are respectively locked to the locking holes 55h and the locking holes 55k of the base plate 55. The screw holes 57b23 and the screw holes 55f are aligned, and then, the screw fastening is performed. At this time, the peripheral edge portion of the through hole 45 of the main back pad 40 is covered, together with a terminal portion of the back cover 20C, by the outer edge portion 57b1 of the lever device 57 without causing a gap or the like therebetween. In this way, the peripheral edge portion of the through hole 45 is in a state in which a terminal of the back cover 20C is covered by the outer edge portion 57b1 of the lever device 57. In parallel, a terminal portion is processed in such a way that the side back pad 30 is attached to the back frame 20F and the back cover 20C is put thereon. Left and right terminal portions of the back cover 20C are locked to the cover locking wire 25.

As shown in FIGS. 7 to 9 and 11, the main back pad 40 is pressed from above in a state where the guide wall portion 55b3 of the left locking portion 55b of the base plate 55 and the guide wall portion 59b3 of the locking member 59 are in contact with the locking wire 24 of the back frame 20F. At this time, the positioning pin P is inserted into the positioning pin hole 22a5 of the base member mounting member 22a and is pressed down while being positioned. Then, the space between the region from the third portion 52b213 to the second portion 52b212 of the left standing wall portion 52b2 and the pressing wall portion 55b2 of the left locking portion 55b of the base plate 55 is pressed and widened, so that the locking wire 24 is fitted thereinto. Then, the fitting of the locking wire 24 is completed in a state where the locking wire 24 is in contact with the connection region between the second portion 52b212 and the first portion 52b211. At the same time, the space between the region from the third portion 52b213 to the second portion 52b212 of the right standing wall portion 52b2 and the pressing wall portion 59b2 of the locking member 59 is pressed and widened, so that the locking wire 24 is fitted thereinto. Then, the fitting of the locking wire 24 is completed in a state where the locking wire 24 is in contact with the connection region between the second portion 52b212 and the first portion 52b211. At this time, a gap between the third portion 52b213 and the pressing wall portion 55b2 is narrower than a gap between the second portion 52b212 and the pressing wall portion 55b2, and a gap between the third portion 52b213 and the pressing wall portion 59b2 is narrower than a gap between the second portion 52b212 and the pressing wall portion 59b2. Thus, when fitting the base member 50 to the locking wire 24, the sliding resistance is high at the beginning and is gradually lowered as the base member 50 is fitted to the locking wire 24. Then, in the state where the attachment of the main back pad 40 to the back frame 20F is completed, the locking wire 24 is pressed between the standing wall portion 52b2 and the pressing wall portion 55b2 and between the standing wall portion 52b2 and the pressing wall portion 59b2, so that the rattling in the front and rear direction does not occur. Further, when the main back pad 40 tries to move upward with respect to the locking wire 24 from the attachment state, that is, when the main back pad 40 tries to move in a direction away from the locking wire 24, the pressing force against the locking wire 24 generated between the standing wall portion 52b2 and the pressing wall portion 55b2 and between the standing wall portion 52b2 and the pressing wall portion 59b2 is increased. Thus, the sliding resistance is increased, thereby making it difficult to move. That is, the rattling in the upper and lower direction is suppressed.

Figure 10:
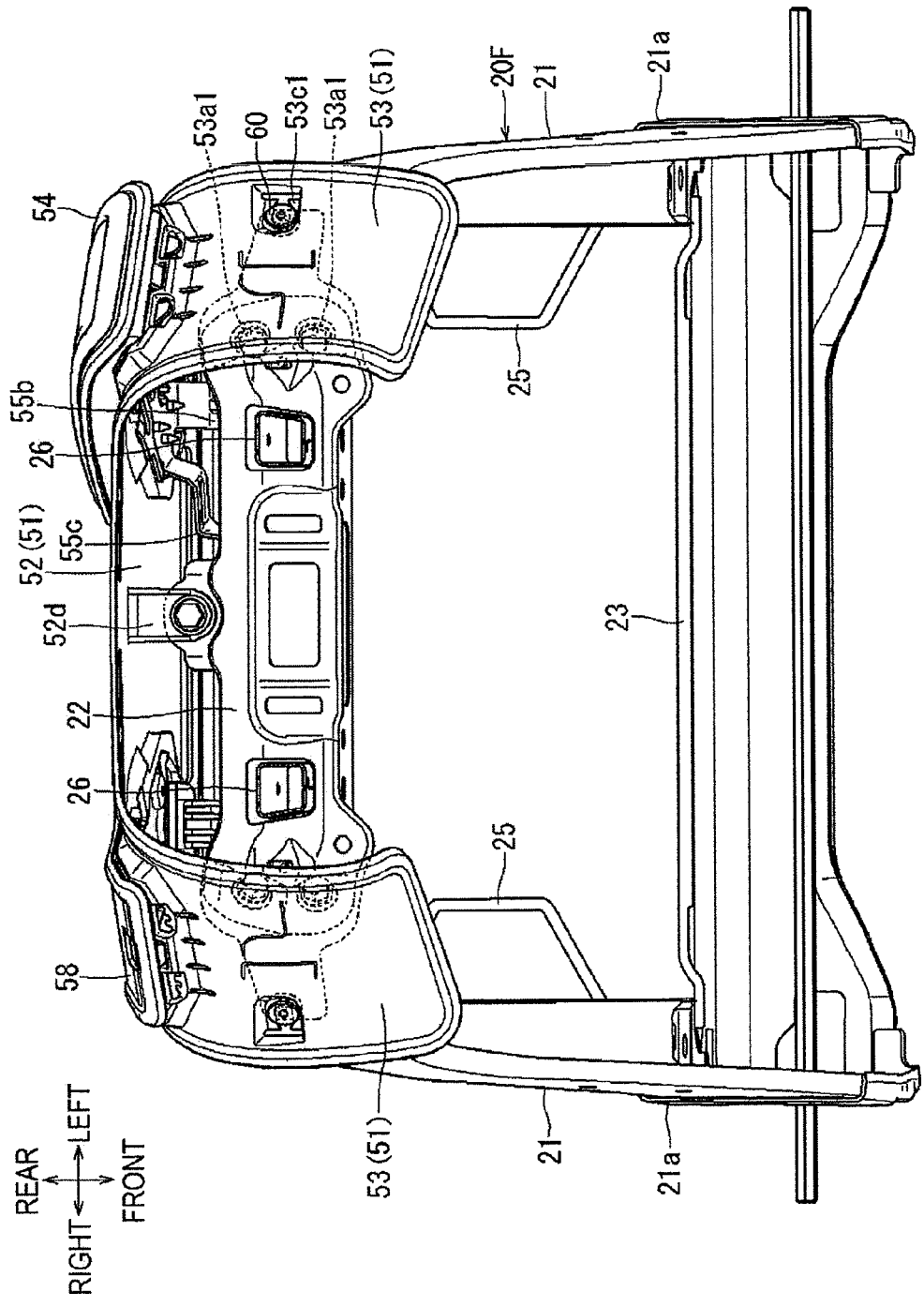
FIG. 10 is a plan view showing a state in which the base member of the above embodiment is attached to the back frame.
Figure 11:
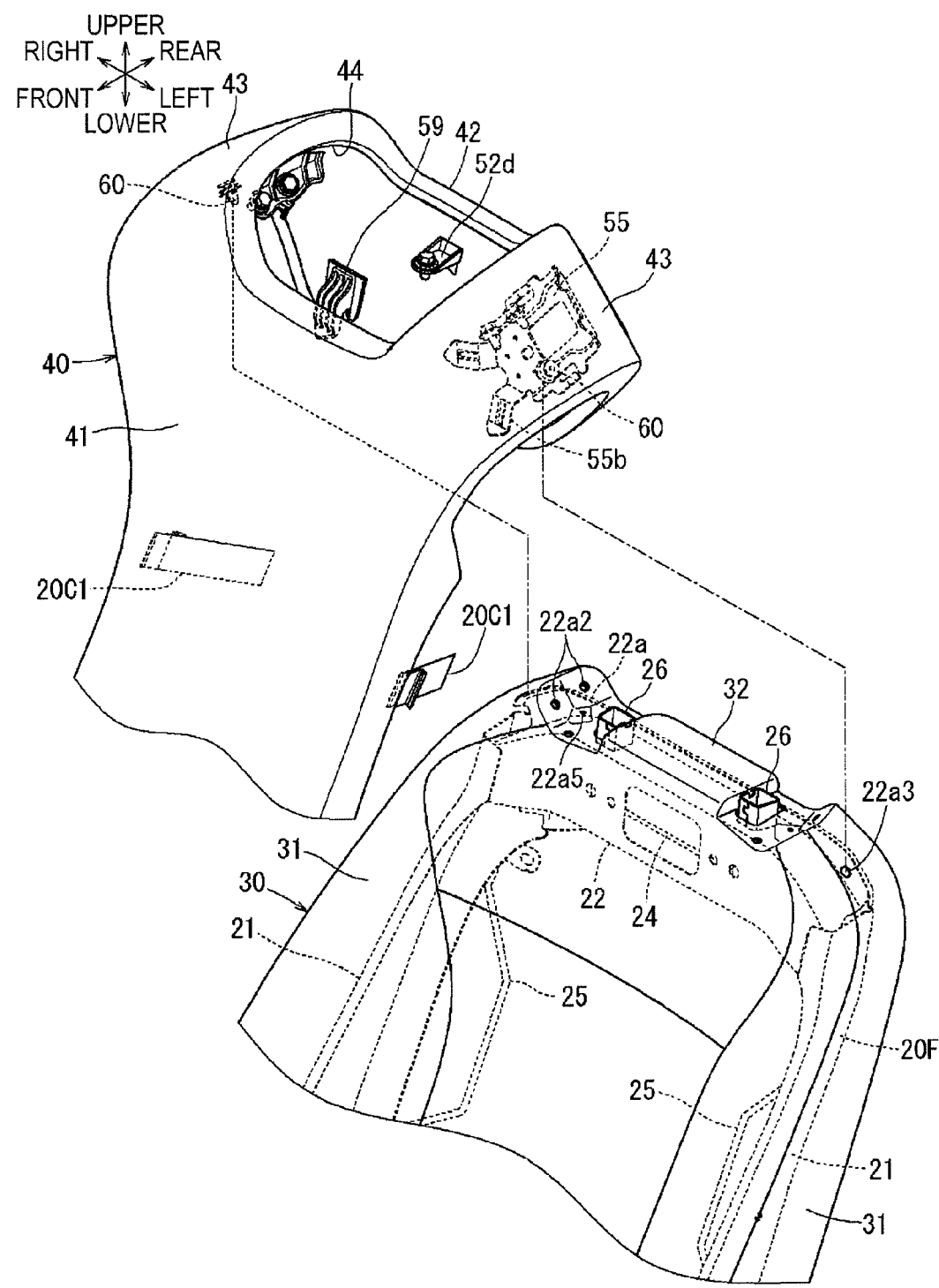
FIG. 11 is a view for explaining an assembling procedure of the seat back of the automobile seat according to the above embodiment.
Figure 12:
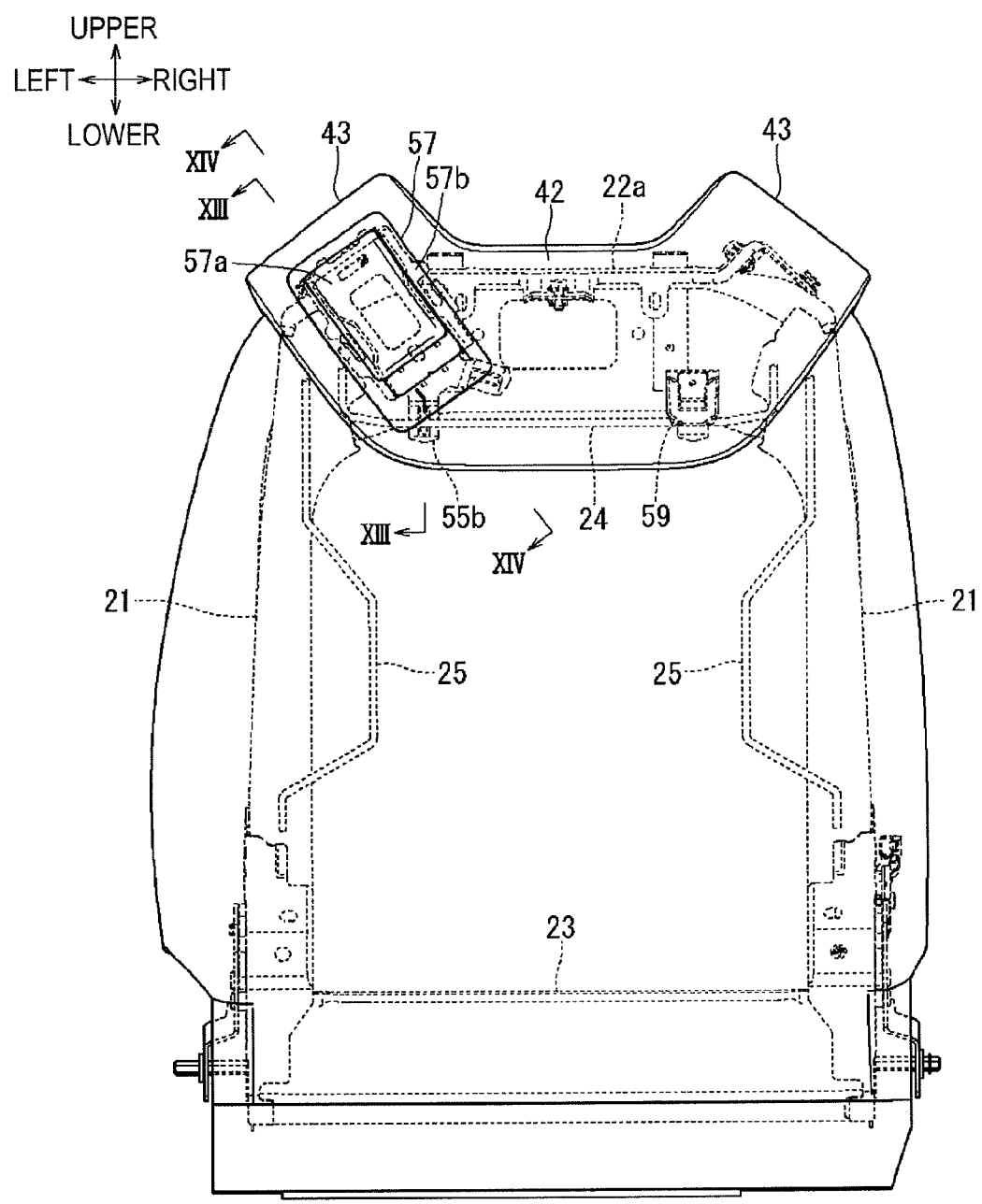
FIG. 12 is a rear view of the seat back of the automobile seat according to the above embodiment.

As shown in FIGS. 1, 10 and 11, in the state where the main back pad 40 is attached to the locking wire 24 from above the back frame 20F to which the side back pad 30 is attached, the locking leg 62 of the clip 60 attached to the base member 50 is fitted and fixed to the clip hole 22a3 of the base member mounting member 22a. In this state, the bolt holes 53a1 of the base member 50 and the bolt holes 22a2 of the base member mounting member 22a are aligned, and these are fastened and fixed by bolts and nuts. Meanwhile, the nuts are previously welded to the peripheral edge portion of the bolt holes 22a2 on the back side of the base member mounting member 22a. Further, the bolt hole 52d1 of the base member 50 and the bolt hole 22a4 of the base member mounting member 22a are aligned, and these are fastened and fixed by bolts and nuts. Meanwhile, the nuts are previously welded to the peripheral edge portion of the bolt hole 22a4 on the back side of the base member mounting member 22a. In this state, cloth-like pulling members 20C1 provided in the back cover 20C on both left and right sides of the front surface portion 41 of the main back pad 40 are pulled rearward as necessary and are locked to the cover locking wire 25 of the back frame 20F. In this way, the main back pad 40 can be more stably attached to the back frame 20F.

The embodiment configured as described above has the following operational effects. The base member 50 is attached to a part of the back side of the main back pad 40 on which the back cover 20C is stretched in such a way that the opening 52a of the base member 50 corresponds to the through hole 45 of the back cover 20C and the main back pad 40. Then, the outer edge portion 57b1 of the lever device 57 is attached so as to cover the outer peripheral terminal portion of the through hole 45 of the back cover 20C and the main back pad 40. In this way, the base member 50 can be attached to the back frame 20F in a state where the lever device 57 having the outer edge portion 57b1 is attached to the base member 50 to which the back cover 20C and the main back pad 40 are attached. In this case, the relative positional relationship between the outer edge portion 57b1 of the lever device 57 and the outer peripheral terminal portion of the through hole 45 of the back cover 20C and the main back pad 40 can be easily kept constant, as compared to the case where the back cover 20C and the main back pad 40, and the lever device 57 are separately attached to the back frame 20F. That is, it is possible to suppress deterioration in appearance quality due to a gap or the like occurring in the joint between these parts. Then, in this state, the base member 50 is attached to the back frame 20F by locking the left locking portion 55b of the base plate 55 having higher strength and higher rigidity than the base member 50 to the locking wire 24 of the back frame 20F. In this way, since the force applied to the lever 57a is transmitted to the back frame 20F through the base plate 55, it is possible to secure the attachment strength of the lever 57a to the back frame 20F even without reinforcing the base member 50.

Further, since it is merely required that the base plate 55 having a shape corresponding to the opening 52a of the base member 50 is made of metal with high strength and high rigidity, it is possible to reduce the weight while maintaining the attachment strength of the lever device 57 to the back frame 20F. Further, since the attachment of the base member 50 to the back frame 20F can be performed by fitting the locking wire 24 into the space between the left locking portion 55b of the base plate 55 and the peripheral edge portion of the opening 52a of the base member 50, the structure is simple. In addition, the base member 50 is formed to extend in a seat width direction and is provided with the opening 52a and the opening 52c on the left and right sides, and the base plate 55 is attached to one of the opening 52a and the opening 52c. Thus, also in the case of, for example, a driver's seat and a passenger's seat where the attachment positions of the lever device 57 are different in left and right, one type of base member 50 can deal with both, and thus, an increase in the number of parts can be suppressed.

Furthermore, the lid member 58 is attached to the opening 52c to which the base plate 55 is not attached, among the opening 52a and the opening 52c. Therefore, since the back cover 20C is supported by the lid member 58 via the main back pad 40 at the portion corresponding to the opening 52c, it is possible to avoid the occurrence of discomfort when the back cover 20C is pressed from the outside. In addition, the lever 57a configured to lock and unlock the forward tilting of the seat back 20 can be attached to the seat back 20 while maintaining the attachment strength and suppressing deterioration in appearance quality.

Although specific embodiments have been described above, the disclosure is not limited to these appearances and configurations, and various modifications, additions and deletions can be made without changing the spirit of the disclosure. For example, the following can be exemplified.

1. In the above embodiment, the outer peripheral terminal portion of the through hole 45 of the back cover 20C and the main back pad 40 is covered with the outer edge portion 57b1 of the lever device 57. However, the disclosure is not limited thereto. For example, the outer peripheral terminal portion of the through hole 45 of the back cover 20C and the main back pad 40 may be covered with the outer frame portion 56e of the intermediate frame body 56.

2. In the above embodiment, the disclosure is applied to an automobile seat. However, the disclosure may be applied to a seat to be mounted on a vehicle such as an airplane, a ship or a train.

The disclosure provides illustrative, non-limiting examples as follows:

According to a first aspect, there is provided a vehicle seat including: a seat back; and an operating lever attached to a back side of the seat back; wherein the seat back includes a first member to which the operating lever is attached and a bezel attached to the first member to surround an outer periphery of the operating lever in a frame shape, wherein the first member has an opening hole through which the bezel passes, wherein the bezel is attached to a second member, which has higher strength and higher rigidity than the first member and is attached to the first member so as to close the opening hole, and is disposed in the opening hole, wherein an outer edge portion opening wherein of the bezel covers the first member at a peripheral edge of the opening hole, and wherein the first member is attached to the seat back frame by locking a locking portion of the second member to a locked portion of the seat back frame.

According to the first aspect, the bezel is attached to the second member which is attached to the first member so as to close the opening hole of the first member. In this way, since the first member can be attached to the seat back frame in a state where the bezel is attached to the first member, the relative positional relationship between the bezel and the opening hole can be easily kept constant, as compared to the case where these parts are separately attached to the seat back frame. That is, it is possible to suppress deterioration in appearance quality due to a gap or the like occurring in the joint between these parts. Then, in this state, the first member is attached to the seat back frame by locking the locking part of the second member having higher strength and higher rigidity than the first member to the locked portion of the seat back frame. In this way, since the force applied to the operating lever is transmitted to the seat back frame through the second member, it is possible to secure the attachment strength of the operating lever to the seat back frame even without reinforcing the first member.

According to a second aspect, there is provided the vehicle seat according to the first aspect, wherein the first member is attached, via a cushion member, to a part of a back side of a seat back cover that is a skin, and shapes the seat back cover, wherein the seat back cover and the cushion member are provided with an opening portion through which the bezel passes, wherein the opening hole of the first member is provided corresponding to the opening portion, and wherein the bezel is disposed in the opening portion and the outer edge portion of the bezel covers the seat back cover and the cushion member at the peripheral edge of the opening portion.

According to the second aspect, the first member is attached to a part of the back side of the seat back cover in such a way that the opening portion of the seat back cover and the cushion member corresponds to the opening hole of the first member, and the bezel is attached to the second member which is attached to the first member so as to close the opening hole of the first member. Thus, since the first member can be attached to the seat back frame in a state where the seat back cover and the cushion member and the bezel are attached to the first member, the relative positional relationship between the bezel and the opening portion can be easily kept constant, as compared to the case where these parts are separately attached to the seat back frame. That is, it is possible to suppress deterioration in appearance quality due to a gap or the like occurring in the joint between these parts. Then, in this state, the first member is attached to the seat back frame by locking the locking part of the second member having higher strength and higher rigidity than the first member to the locked portion of the seat back frame. In this way, since the force applied to the operating lever is transmitted to the seat back frame through the second member, it is possible to secure the attachment strength of the operating lever to the seat back frame even without reinforcing the first member.

According to a third aspect, there is provided the vehicle seat according to the first or second aspect, wherein the first member is made of resin and the second member is made of metal.

According to the third aspect, since the second member having a shape corresponding to the opening hole of the first member can be made of metal with high strength and high rigidity, it is possible to reduce the weight while maintaining the attachment strength of the bezel to the seat back frame.

According to a fourth aspect, there is provided the vehicle seat according to any one of the first to third aspects, wherein the locking portion is a protrusion piece extending to oppose the peripheral edge portion of the opening hole of the first member when the second member is attached to the first member, and the locked portion is a linear member attached to the seat back frame, and the first member is attached to the seat back frame by sandwiching the linear member between the protrusion piece and the peripheral edge portion.

According to the fourth aspect, since the attachment of the first member to the seat back frame can be performed by fitting the linear member into the space between the protrusion piece of the second member and the peripheral edge portion of the opening hole of the first member, the structure is simple.

According to a fifth aspect, there is provided the vehicle seat according to any one of the first to fourth aspects, wherein the first member extends in a seat width direction and has a pair of left and right opening holes, and the second member is attached to one of the left and right opening holes.

According to the fifth aspect, also in the case of, for example, a driver's seat and a passenger's seat where the attachment positions of the operating lever are different in left and right, one type of first member can deal with both, and thus, an increase in the number of parts can be suppressed.

According to a sixth aspect, there is provided the vehicle seat according to the fifth aspect, wherein the second member is provided with two protrusion pieces for left side and right side, and wherein the locked portion extends in the seat width direction and is configured such that either of the two protrusion pieces can be locked thereto when the second member is attached to any one of the pair of left and right opening holes.

According to the sixth aspect, since the second member can be commonly used for a pair of left and right opening holes, an increase in the number of parts can be suppressed.

According to a seventh aspect, there is provided the vehicle seat according to the fifth or sixth aspects, wherein a blind lid is attached to the opening hole to which the second member is not attached, among the pair of left and right opening holes.

According to the seventh aspect, the blind lid is attached to the opening hole to which the second member is not attached, among the pair of left and right opening holes of the first member. Therefore, since the seat back cover is supported by the blind lid via the cushion member at the portion corresponding to the opening hole, it is possible to avoid the occurrence of discomfort when the seat back cover is pressed from the outside.

According to an eighth aspect, there is provided the vehicle seat according to any one of the first to seventh aspects, wherein the operating lever is configured to lock or unlock forward tilting of the seat back.

According to the eighth aspect, the operating lever configured to lock and unlock the forward tilting of the seat back can be attached to the seat back while maintaining the attachment strength and suppressing deterioration in appearance quality.

What is claimed is:

1. A vehicle seat comprising:
    a seat back that includes a seat back frame; and
    an operating lever attached to a back side of the seat back
        wherein
    the seat back includes a first member to which the operating lever is attached and a bezel attached to the first member to surround an outer periphery of the operating lever in a frame shape,
    the first member has an opening hole through which the bezel passes,
    the bezel is disposed in the opening hole and is attached to a second member, the second member having a higher strength and a higher rigidity than the first member and being attached to the first member so as to at least partially close the opening hole,
    an outer edge portion of the bezel covers the first member at a peripheral edge of the opening hole, and
    the first member is attached to the seat back frame by locking a locking portion of the second member to a locked portion of the seat back frame.

2. The vehicle seat according to claim 1, wherein
the first member is attached, via a cushion member, to a part of a back side of a seat back cover that is a skin, and shapes the seat back cover,
wherein the seat back cover and the cushion member are provided with an opening portion through which the bezel passes,
wherein the opening hole of the first member is provided corresponding to the opening portion, and
wherein the bezel is disposed in the opening portion and the outer edge portion of the bezel covers the seat back cover and the cushion member at the peripheral edge of the opening portion.

3. The vehicle seat according to claim 1, wherein
the first member is made of resin and the second member is made of metal.

4. The vehicle seat according to claim 1, wherein
the locking portion is a protrusion piece extending to oppose the peripheral edge portion of the opening hole of the first member when the second member is attached to the first member, and the locked portion is a linear member attached to the seat back frame, and the first member is attached to the seat back frame by sandwiching the linear member between the protrusion piece and the peripheral edge portion.

5. The vehicle seat according to claim 1, wherein
the first member extends in a seat width direction and has a pair of left and right opening holes, and the second member is attached to one of the left and right opening holes.

6. The vehicle seat according to claim 5, wherein
the second member is provided with two protrusion pieces for left side and right side, and
wherein the locked portion extends in the seat width direction and is configured such that either of the two protrusion pieces can be locked thereto when the second member is attached to any one of the pair of left and right opening holes.

7. The vehicle seat according to claim 5, wherein
a blind lid is attached to the opening hole to which the second member is not attached, among the pair of left and right opening holes.

8. The vehicle seat according to claim 1, wherein
the operating lever is configured to lock or unlock forward tilting of the seat back.

* * * * *